Patented May 26, 1953

2,639,977

UNITED STATES PATENT OFFICE 2,639,977

CHEMICAL PROCESS

John W. Churchill, Kenmore, N. Y., assignor to Mathieson Chemical Corporation, a corporation of Virginia No Drawing. Application November 15, 1951,
Serial No. 256,614

5 Claims. (Cl. 23—207)

This invention relates to a process of removing liquid droplets of caustic solution from oils in which they are dispersed by reaction with an acid carbonate. More particularly the invention relates to the use of solid carbonates and bicarbonates for this purpose.

In various manufacturing operations droplets of caustic solutions become dispersed in the oils being treated. Ordinarily such droplets may be removed by settling, centrifuging or washing with water but in many cases this is a difficult operation. Usually the complete removal of such droplets is essential to further processing and the steps required are expensive.

This invention is particularly useful, for example, in removing dispersions of aqueous caustic droplets from hydrocarbon oil solutions of parahydrazotoluene obtained in the manufacture of hydrogen peroxide by the azo-hydrazo process. In that process a solution of an aromatic azo compound; e. g. paraazotoluene, in a suitable solvent, for example, ditolylethane or a mineral oil having suitable characteristics, is treated with a dilute sodium amalgam and water to reduce, for example, the paraazotoluene contained in the solvent to parahydrazotoluene. The purified caustic-free solution of parahydrazotoluene in hydrocarbon oil is oxidized by means of oxygen gas to paraazotoluene and hydrogen peroxide. The latter is extracted with water and the paraazotoluene solution is recycled to the reduction step. In the reduction operation a portion of the by-product aqueous caustic is dispersed in the oil and its removal is essential before oxidizing the oil since the alkali decomposes any hydrogen peroxide formed. Previously the removal of the dispersed aqueous caustic by settling, centrifuging or the like has proved expensive either in requiring an excessive number and volume of holding tanks or expensive centrifuging equipment. This is partly due to the small difference in density between the oil and aqueous caustic. Although the bulk of the aqueous caustic may be thus removed in a relatively short time with a reasonable outlay for equipment, the removal of the last of the caustic is always expensive and either difficult or slow.

In accordance with my invention an oil containing a minor amount of undissolved aqueous alkali metal hydroxide or caustic in the form of finely dispersed droplets is contacted with a water-soluble acid carbonate, advantageously in the form of a solid reactant comprising an alkali metal bicarbonate, but preferably in the form of a mixture of solid alkali metal bicarbonate, such as sodium bicarbonate and sodium carbonate. I have found that the method has particular value in the azo-hydrazo process for the manufacture of hydrogen peroxide for treating the reduced oil prior to the oxidation step to remove finely dispersed droplets of aqueous caustic. I have found that contacting the reduced oil with solid bicarbonate or a mixture of solid bicarbonate and solid carbonate produces an oil which is especially susceptible to rapid and efficient oxidation. Thus in a more special aspect, my invention represents an improvement in the azohydrazo process for the manufacture of hydrogen peroxide which comprises the step of contacting the reduced oil containing finely dispersed aqueous caustic with a solid alkali metal bicarbonate or a mixture of solid alkali metal bicarbonate and carbonate.

My invention however is applicable not only to aqueous caustic dispersed in the oil used in the peroxide process as described above but also to other solutions of caustic whether in water, alcohol or other solvents for caustic alkalis and also for other oils which may be hydrocarbons or other non-solvents for the caustic solution. The process is applicable, for example, to droplets of alcoholic caustic in glyceride oils. Furthermore, dispersions of solutions of other alkali metal hydroxides such as potassium hydroxide or lithium hydroxide may be removed as well as sodium hydroxide.

According to my invention the proportion of bicarbonate used is at least sufficient to react with the amount of caustic dispersed in the oil to be treated to form sodium carbonate. The proportion of sodium carbonate added or formed in the reaction is at least sufficient to combine with all of the water present and formed in the neutralization. It is usually simpler to use an excess of either or both of the reagents than to calculate and use exactly the theoretical amount. Furthermore the rate of reaction of the bicarbonate with the caustic is very slow when only the calculated amounts of reagent are used. Because the reagents are cheap and may be re-used, it is preferred to use a considerable excess of reagent in order to reduce the necessary time of contact to a minimum consistent with thorough removal of the caustic and water. A ten-fold excess is advantageous. More appears to have little effect in reducing the time or increasing the effectiveness and may unduly add to the burden of removal. Less than a ten-fold excess may be used where time is not an important factor but the use of at least the theoretical amount of reagent is recommended.

The oil may be contacted in any suitable way with the bicarbonate or mixtures of bicarbonate and carbonate. For example, the calculated amount or more of the bicarbonate and carbonate to react with the caustic and to combine with the water to form a hydrated carbonate may be added to the oil. The mixture is then agitated for a period of time permitting complete reaction and combination; e. g. several minutes to about half an hour, and the solids removed by settling or filtration. Alternatively, the oil may be percolated through a bed of the reagents. It is desirable, when treating an oil in this manner, to provide a bed containing largely sodium bicarbonate at the top and largely sodium carbonate in the lower portion of the bed. Neutralization of the bicarbonate and hydration of the soda ash occurs in the bed and the effluent oil is neutral and dry. The contaminated oil may be treated with carbon dioxide or a carbon dioxide-containing gas in a suitable contacting tower whereby the caustic droplets are neutralized to form sodium carbonate. Depending on the relative proportion of water and sodium carbonate the latter may separate as a solid and may be removed from the oil by filtration. It is generally the case, however, that after carbonation of the oil it is passed with advantage through a bed or contacted otherwise with further quantities of solid sodium bicarbonate or bicarbonate-carbonate mixtures to complete the reaction and to provide ample carbonate for dehydration. Final filtration serves to remove suspended solids as well as any entrained mercury and to produce a clear, bright oil for return to the process.

Sodium bicarbonate and sodium carbonate however are preferred because of their availability and cheapness but potassium bicarbonate and potassium carbonate as well as bicarbonates and carbonates of the other alkali metals may be used. Also a wholly unexpected advantage of the present invention is that the oil after contacting with a solid bicarbonate or a solid bicarbonate-carbonate mixture is considerably more susceptible to the subsequent oxidation step for the manufacture of peroxide than the oil produced when the caustic droplets are removed by centrifuging or by other mechanical means such as settling. No reason can be assigned for any difference in oxidation behavior but the rate of reaction with oxygen may be several times that of the oil from which the caustic is removed mechanically.

Using sodium bicarbonate and sodium carbonate at temperatures below about 33.5° C. the minimum necessary proportion of sodium carbonate is that required to form $Na_2CO_3.10H_2O$ with the water present and formed by the neutralization. Where the operation is accomplished at temperatures over about 33.5° C. a larger proportion of sodium carbonate is required as at such higher temperatures only sesquicarbonate (a dihydrate) or the monohydrate of sodium carbonate are stable. Usually an excess of either or both of these reagents is used.

The process of my invention may be batchwise or continuous. Thus sodium bicarbonate may be added to a portion of the dispersion of droplets of caustic in oil and the mixed solids containing excess bicarbonate and more or less hydrated soda ash removed by filtration and discarded. It is convenient, however, to use an excess of bicarbonate containing sufficient carbonate to form a hydrate with all the water in and formed in the oil. The filtered solid is re-used with another batch until it fails to produce a bright, clear oil in a reasonable time of treatment after which it may be discarded. Using the percolation method, the oil containing caustic solution dispersed therein is filtered through the bed of reagent until it no longer runs clear then the flow is switched to a tower containing a fresh charge of reagent. The first tower is cleaned and recharged.

An added advantage of the present process for removing caustic from oils, when applied to the treatment of oil solutions used in the above described hydrogen peroxide process, is that the filtration of the bicarbonate-carbonate cake also serves to trap and effectively remove any mercury or amalgam entrained in the oil. It is advantageous to recover the oil and mercury from the cake of used solid reagents by dissolving the latter in water and separating from the aqueous solution any oil with which the solid was wet, drying and returning it to the process and also separating any mercury or amalgam entrained in the filter cake and returning it also to the process.

The following examples are illustrative of the above described aspects of my invention.

*Example I*

An oil solution of parahydrazotoluene containing dispersed therein in the form of fine droplets about 100 pounds of aqueous caustic containing 19.8 per cent of sodium hydroxide in water was treated with 41.5 pounds of solid sodium bicarbonate by thorough agitation. The operation was carried out below 33.5° C. at about room temperature and sufficient sodium carbonate was formed in the neutralization to combine with all of the water as the solid decahydrate. The filtered oil was bright and clear.

*Example II*

A petroleum oil contained one per cent of finely dispersed droplets of 20 per cent aqueous caustic. To 100 pounds of the emulsion was added 5.1 pounds of a mixture of 8.2 per cent of sodium bicarbonate and 91.8 per cent of sodium carbonate. The mixture was agitated thoroughly and filtered at a temperature of 65° C. The caustic was neutralized and all the water combined with the soda ash as crystal water yielding a bright, clear filtrate.

*Example III*

This example shows the results of the conventional centrifuge separation of residual dispersed caustic for comparison with the new and improved process of caustic removal in hydrogen peroxide manufacture.

A 9 per cent by weight solution of para-azotoluene in hydrocarbon oil (7.5 pounds) was reduced to a solution of parahydrazotoluene by treatment with an excess of sodium amalgam in the presence of 1.30 pounds of water. After settling, 1.43 pounds of 16.7 per cent aqueous caustic was separated from the reduced mixture and approximately 0.03 pound of 16.7 per cent aqueous caustic remained entrained in the oil. The suspension was centrifuged to remove the entrained caustic and the entire batch of oil amounting to 7.5 pounds was oxidized for two hours at 70° C. under an oxygen pressure of 32.2 pounds per square inch. The product was washed with 100 grams of water and the peroxide thus recovered as 110 grams of a solution of 28.9 per cent $H_2O_2$ by weight, representing a conversion of approximately 82 per cent.

Example IV

Another sample of the same 9 per cent paraazotoluene solution in oil amounting to 9.90 pounds was reduced with sodium amalgam in the presence of 1.1 pounds of water. By settling, 1.260 pounds of 25.9 per cent aqueous caustic was separated. Approximately 0.023 pound of 25.9 per cent caustic remained entrained in the oil. A tenfold excess of solid sodium bicarbonate over that calculated to react with the entrained caustic, the former being 0.125 pound, was stirred with the oil for 30 minutes at 60° C. The resulting mixture of solids was filtered from the oil and a portion of the latter was oxidized for a period of only one hour at 70° C. using an oxygen pressure of only 14.7 pounds per square inch. The oxidized oil was extracted with 100 grams of water and 121.3 grams of aqueous hydrogen peroxide containing 29.92 per cent by weight of $H_2O_2$ was recovered. This represents a conversion of 91.5 per cent. Other experimental work has established that the rate of oxidation is proportional to the oxygen pressure so that the rate of oxidation in Example IV was approximately four times that of Example III.

Example V

In a series of experiments reduced oil containing dissolved parahydrazotoluene and entrained aqueous caustic was treated with solid sodium bicarbonate, filtered and oxidized. The solid filtered from the reduced oil was re-used in three subsequent batches of the same reduced oil with excellent results. In each treatment about 2 pounds of reduced oil containing 0.007 pound of entrained 30 per cent caustic was treated with the bicarbonate cake recovered from the previous batch at 60–70° C. for 15 minutes. The following table shows that the parahydrazotoluene in the oil oxidized at a rapid rate and that excellent yields of hydrogen peroxide were obtained.

| Batch No. | NaHCO₃ Used | Oxidation Time, Min. | Conversion, Percent |
|---|---|---|---|
| 1 | Fresh | 33 | 97.5 |
| 2 | Recovered from Batch 1 | 30 | 89.6 |
| 3 | Recovered from Batch 2 | 30 | 95.5 |
| 4 | Recovered from Batch 3 | 50 | 95.0 |

I claim:

1. The process of removing liquid droplets of caustic solution from dispersion in oil which comprises contacting an oil containing a minor amount of undissolved aqueous alkali metal hydroxide in the form of finely dispersed droplets with a water-soluble acid carbonate present in an amount at least sufficient to combine with all of the aqueous hydroxide and separating the oil from the carbonate.

2. The process of removing liquid droplets of caustic solution from dispersion in oil which comprises contacting an oil containing a minor amount of undissolved aqueous alkali metal hydroxide in the form of finely dispersed droplets with a solid reactant comprising an alkali metal bicarbonate present in an amount at least sufficient to combine with all of the aqueous hydroxide and separating the oil from the solid reactant.

3. The process of removing liquid droplets of caustic solution from dispersion in oil which comprises contacting an oil containing a minor amount of undissolved alkali metal hydroxide in the form of finely dispersed droplets with a solid reactant comprising a mixture of sodium bicarbonate and sodium carbonate present in an amount at least sufficient to combine with all of the aqueous hydroxide and separating the oil from the carbonates.

4. In the azo-hydrazo process for manufacturing hydrogen peroxide wherein a solution of an aromatic azo compound in an organic solvent is reduced by treatment with sodium amalgam and water to form the corresponding hydrazo compound and caustic soda, the reduced oil is separated from the aqueous caustic and then oxidized by treatment with an oxygen bearing gas, the improvement which comprises contacting the reduced oil before the oxidation step with a solid reactant comprising an alkali metal bicarbonate present in an amount at least sufficient to combine with any aqueous caustic present in the oil in the form of finely dispersed droplets and separating the reduced oil from the solid reactant.

5. In the azo-hydrazo process for manufacturing hydrogen peroxide wherein a solution of an aromatic azo compound in an organic solvent is reduced by treatment with sodium amalgam and water to form the corresponding hydrazo compound and caustic soda, the reduced oil is separated from the aqueous caustic and oxidized by treatment with an oxygen bearing gas, the improvement which comprises contacting the reduced oil before the oxidation step with a solid reactant comprising a mixture of sodium bicarbonate and sodium carbonate present in an amount at least sufficient to combine with any aqueous caustic present in the oil in the form of finely dispersed droplets and separating the reduced oil from the solid reactant.

JOHN W. CHURCHILL.

No references cited.